July 14, 1925.

W. W. BOULINEAU

DRIFTING AND RELIEF VALVE

Filed June 24, 1922

Inventor
William W. Boulineau,
By Watson E. Coleman
Attorney

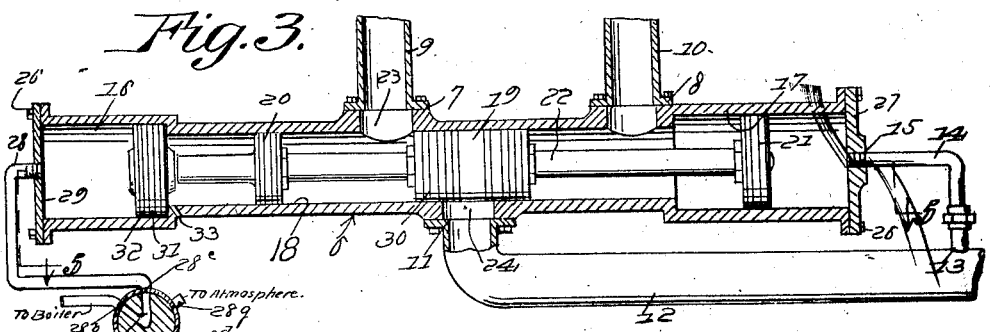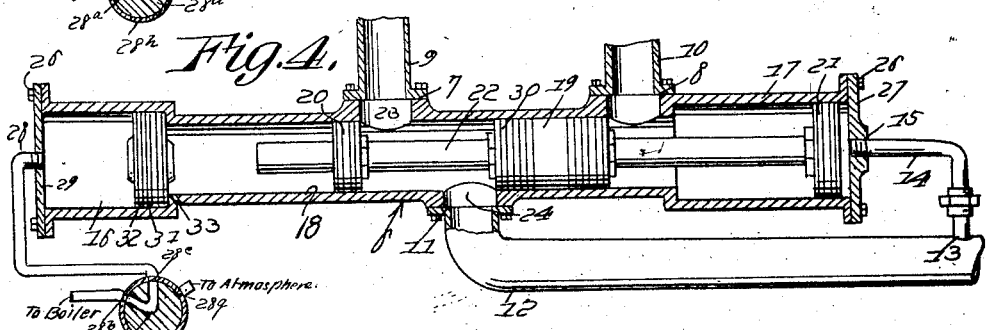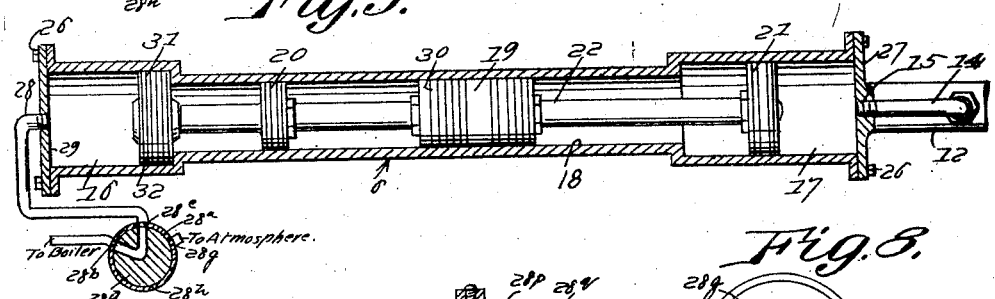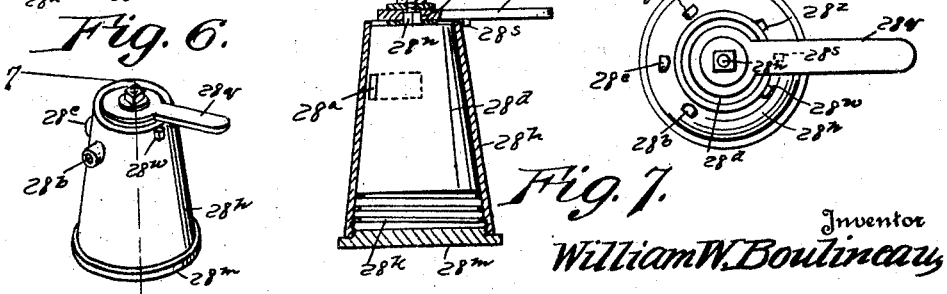

Patented July 14, 1925.

1,545,635

UNITED STATES PATENT OFFICE.

WILLIAM W. BOULINEAU, OF CEDARTOWN, GEORGIA, ASSIGNOR OF ONE-FOURTH TO FREDERICK HANS SCHLAPBACH, OF CEDARTOWN, GEORGIA.

DRIFTING AND RELIEF VALVE.

Application filed June 24, 1922. Serial No. 570,569.

*To all whom it may concern:*

Be it known that I, WILLIAM W. BOULINEAU, a citizen of the United States, residing at Cedartown, in the county of Polk and State of Georgia, have invented certain new and useful Improvements in Drifting and Relief Valves, of which the following is a specification, reference being had to the accompanying drawings.

The present invention has for its purpose the provision of a drifting and relief valve for use in connection with superheated locomotives, enabling the locomotive to operate more successfully and economically, due to the balancing of the steam pressure upon the pistons of the valve.

Another purpose is to provide a drifting and relief valve which is positive in its operation, and wherein the relief action insures such positive operation, due to rendering the locomotive absolutely safe while standing, as the steam which may leak through the throttle valve to the cylinders will escape to the atmosphere.

It is obvious that the present invention is an improvement over the construction of the combination throttle, drifting and relief valve set forth and claimed in the application of William W. Boulineau, filed April 5, 1922, Serial No. 549,674, and will insure a reduction in the cost of lubrication, which necessarily results in fuel economy, therefore insure a minimum cost of maintenance for the locomotive cylinders and valve boxings.

A still further purpose is the provision of a drifting and relief valve, including a floating piston operable by means of the application of steam pressure thereon to move the piston valves to not only shut off communication between the steam chest and the steam dome and between the steam chest and the atmosphere while the locomotive is working steam, but to cause a position of the locomotive drifting valve to provide communication between the steam dome and the steam chest and to maintain the steam chest shut off from the atmosphere when the locomotive is drifting.

It is to be understood that the particulars herein given are for the purpose of illustration and that while still keeping within the scope of the invention, any desired modifications of detail and desired proportions may be made in the apparatus according to circumstances, provided there is no departure from the scope of the claims.

The invention comprises further features and combination of parts, as will be hereinafter set forth, shown in the drawings and claimed.

In the drawings:—

Figure 1 is a view in side elevation of a locomotive, showing the application of the improved drifting and relief valve, showing the piston valves in dotted positions, when the locomotive is standing;

Figure 2 is an enlarged longitudinal sectional view through the drifting and relief valve, showing the various pipes leading from the casing of said valve for connection to various parts of the locomotive, such as the three-way valve to be located in the cab, the steam dome and the steam chest, there also being a conduit of communication between the casing of the valve and the atmosphere, and showing the positions of the piston valves when the locomotive is standing.

Figure 3 is a similar sectional view through the drifting and relief valve, showing the positions of the piston valves when the locomotive is working steam;

Figure 4 is a similar sectional view through the drifting and relief valve showing the positions of the piston valves when the locomotive is drifting, and saturated steam is flowing from the steam dome to the steam chest;

Figure 5 is a longitudinal sectional view on line 5—5 of Figure 3, showing the construction at right angles to that in said figures;

Figure 6 is a perspective view of the three-way valve, which is shown in elevation in Figure 1 and in cross section in Figures 2, 3 and 4;

Figure 7 is a longitudinal sectional view on line 7—7 of Figure 6 showing the spring for holding the three-way valve proper against the conical walls of the casing;

Figure 8 is an end view showing the lever, the lug and the abutments for limiting the movement of the valve proper.

Figure 1:
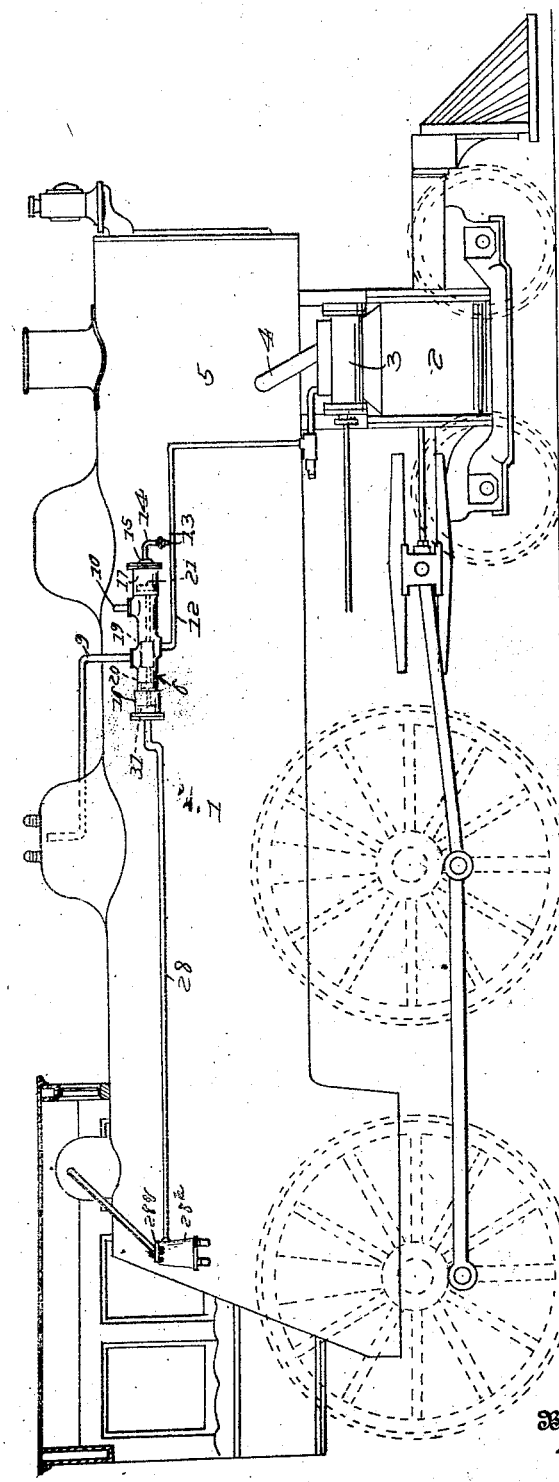

Referring to the drawings, 1 designates a conventional form of locomotive, which is provided with the usual steam cylinders 2, the steam chest 3 and the steam pipe 4, and mounted upon and carried by the side of a boiler 5 of the locomotive is the casing 6 of the improved drifting and relief valve. This casing 6 is of elongated form, and connected thereto as at 7 and 8 are pipes 9 and 10. These pipes extend from the casing 6, and their connections to the casing are spaced, and are located short distances from the ends of the casing. The pipe 9 communicatively connects with the steam dome, whereas the pipe 10 communicates with the atmosphere. Also connected to the casing 6 as at 11, at a point substantially intermediate the ends of the casing, and between the connections 7 and 8 of the pipes 9 and 10 and opposite thereof is a pipe 12. The pipe 12 connects with the steam chest, and communicatively connecting with the pipe 12 as at 13 is a pipe 14, which communicatively connects at 15 to one end of the casing 6. The pipe 14 is designed for conducting a pressure of steam from the pipe 12 into the casing.

The casing 6, as above stated, is elongated and is provided with three chambers, two end chambers 16 and 17, and an intermediate chamber 18. The end chambers 16 and 17 in actual practice are designed to be at least one-half an inch greater in diameter than the intermediate chamber 18.

Operable in the chamber 18 are the piston valves 19 and 20 and within the chamber 17 is a piston valve 21, all of which are connected axially by means of the piston rod 22. The two ports of communication 23 and 24 of the pipes 9 and 12 are diagonally opposite, and due to the length of the piston valve 19, they are controlled by said valve during its operation. The piston valve 20 is practically an idle member, in so far as controlling a port is concerned. Each head of the casing is secured in place by means of the usual bolts 26, and the pipe 14 connects to the head 27, while a pipe 28 is connected to the head 29. This pipe 28 communicatively and operatively connects with a three-way valve located in a cab of the locomotive, and before the locomotive throttle valve is opened, this three-way valve which is located in the cab of the locomotive must be closed.

The piston valve 19 is provided with the usual packing rings 30, and the length of the piston valve 19 is sufficient to more than fully cover the port of communication 11 when the locomotive is working steam, and wherein communication between the dome and the steam chest and between the atmosphere and the steam chest are cut off. The location of the ports of communication 7 and 11 of the pipes 9 and 12 are such as to enable the port 23 to the dome to be cut off when the locomotive is standing, and when the locomotive is standing the piston valve 19 may be positioned to shut off communication between the steam chest and the atmosphere and open communication between the steam dome and the chest.

Mounted in the chamber 16 is a floating piston 31 provided with packing rings 32, and is operated by incoming steam entering the chamber 16. The piston valve 20 maintains communication between the steam dome and the chamber 16 cut off at all times. However the chamber 18 adjacent where it unites with the chamber 16 is provided with a leakage port 33, for the purpose of carrying off any leakage.

The operation of the drifting and relief valve is as follows:—For instance before the locomotive throttle valve is opened, the three-way valve 28$^a$ (which is located in the cab of the locomotive) must be closed to the atmosphere as shown in Figure 3. At this period, steam will be admitted into the chamber 16 through the pipe 28, which will force the floating piston 31 to the position shown in Figure 3. As the floating piston 31 abuts the piston rod 22 it will move the piston rod 22 and the piston valves 19, 20 and 21 so that the piston valve 19 will shut off communication between the steam chest and the steam dome, and between the steam chest and the atmosphere. In other words the floating piston 31 causes the piston valves to assume positions shown in Figure 3 when the locomotive is working steam.

When the throttle is open steam entering the drifting valve chamber through the pipe 14 from the locomotive steam chest, will hold the pistons 19, 20 and 21 in the positions shown in Figure 3 until the throttle valve is closed, at which time a vacuum will form to right of piston 21 in the drifting valve chamber 17.

Atmospheric pressure on the opposite side of the piston valve 21 which enters the chamber through the pipe 10, will force the piston to the end of the chamber, moving the pistons 19 and 21 to positions shown in Figure 4. Steam will then be admitted from the steam dome to the locomotive cylinders through the pipes 9 and 12 as shown. When the locomotive throttle is again opened, steam entering valve chamber 17 through the pipe 14 will force the piston valves back to initial position as shown in Figure 3. It will be noted that this will blank or cut off all communication through the drifting valve from pipe 9 to 12.

Figure 2:
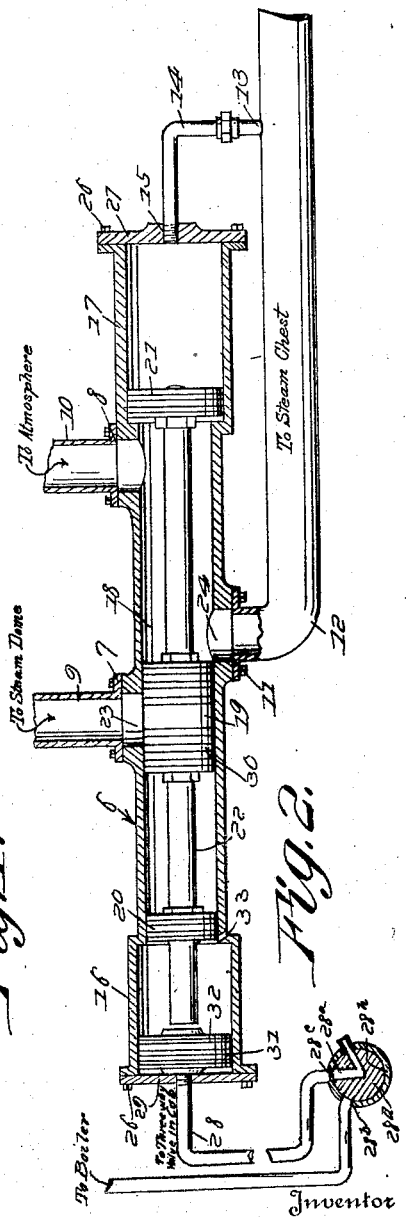

When the locomotive is stopped and it is desired to open the relief valve, steam pressure against the piston 31 must be relieved through the pipe 28 to the atmosphere by operation of the three-way valve which is located in the cab, to position shown in Figure 2. The leakage port 33 is provided for the purpose of carrying off any leakage of steam, which may collect between the piston valves 19 and 20. It is to be noted that steam pressure is normally in the chamber 16 of the drifting valve, which holds the floating piston 31 in position as shown in Figures 3 and 4, until it is desired to have the piston valves moved to relief positions.

The three-way valve as previously stated is attached to the boiler inside the locomotive cab as shown in Figure 1 of the drawings, by suitable brackets as indicated. The passage 28$^a$ of the three-way valve 28 has two outlets, which may register with the ports 28$^b$ and 28$^c$, to permit steam from the boiler to enter the drifting and relief valve. The valve proper 28$^d$ can also be rotated, so that the outlets of the passage 28$^a$ may register with the ports 28$^c$ and 28$^g$, thereby permitting steam from the chamber 16 of the drifting and relief valve to pass to the atmosphere by way of the port 28$^g$. The valve proper 28$^d$ corresponds to and is mounted in a casing 28$^h$, there being a coil spring 28$^k$ between the larger end of the valve and the head 28$^m$ of the casing. This head is threaded into the casing to retain the spring in position. One end of the valve proper 28$^d$ is provided with a reduced extension 28$^n$, which is square or rectangular in cross section to engage a correspondingly shaped opening 28$^p$ of a lever 28$^q$, which is provided for the purpose of rotating the three-way valve proper so as to close the passage 28$^a$, or to register it with any two of the ports 28$^d$, 28$^c$ and 28$^g$. The lever 28$^q$ has a lug 28$^s$, which is arranged to have limited movement between the shoulders 28$^w$ and 28$^z$, so as to limit the valve proper in different positions. The lever is secured on the extension in any suitable manner, preferably as illustrated in the drawings.

Figure 2 of the drawings shows the drifting and relief valve in position when locomotive is at rest, in fact in relief position. Steam has been exhausted from the chamber 16 by the operation of the three-way valve, until its passage 28$^a$ registers with the ports 28$^c$ and 28$^g$. Steam pressure from the steam chest acts against the piston 21, and has caused the valve 19 to move back to the position shown. This will allow steam to pass from the steam chest to the atmosphere through pipes 12 and 10, as shown in Figure 2. Figure 3 shows drifting and relief valve in position when the locomotive is working steam, which may be termed as running position. To accomplish this operation, the engineer by operation of the three-way valve permits steam from the boiler to enter the chamber 16, which will force piston 32 to the opposite end of the chamber. By this operation communication between the pipes 9 and 12 is cut off, which prevents steam from the boiler to enter the steam chest through said pipes. In Figure 4 the drifting and relief valve is in drifting position, in which case the piston valve 21 has been forced to this position by the action of a suction or vacuum being formed in the chamber 17. This vacuum or suction is formed when the locomotive throttle valve is closed, while the locomotive is in motion, which results in a vacuum being formed in the cylinders, steam chests, and also in pipe 12, and a vacuum is necessarily formed in this chamber 17, as it is connected to the pipe 12 through the medium of the pipe 14. When the throttle valve is opened again or the locomotive comes to a stop, steam pressure acting against the piston 21 will again force valve to running position. When locomotive comes to a stop, if it is desired to place the drifting and relief valve in relief position, steam will be exhausted from chamber 16 to the atmosphere, by operation of the three-way valve, and causing the passage 28$^a$ to register with the ports 28$^c$ and 28$^g$.

The invention having been set forth, what is claimed is:—

1. In a locomotive, a drifting and relief valve mechanism comprising a casing having a chamber at one end thereof, a floating valve chamber at the other end thereof and an intermediate chamber communicating with both thereof, a connection between the intermediate chamber and the steam dome of the locomotive, an outlet connection between said intermediate chamber and the atmosphere, a connection between the steam chest of the locomotive and the intermediate chamber between said connections, a connection between the steam chest and the first named end chamber, a floating piston within said floating valve chamber, and a movable valve assembly including a piston within the first named end chamber, a guide piston within the intermediate chamber between the floating valve chamber and the connection to the steam dome and further including a valve piston within the intermediate chamber adapted to cover and uncover the connection to the steam dome and the connection to the steam chest, and means for supplying pressure into the outer end of said floating valve chamber and for establishing communication between the floating valve chamber and the atmosphere.

2. In a locomotive, a drifting and relief valve mechanism comprising a casing having a chamber at one end thereof, a floating valve chamber at the other end thereof and an intermediate chamber communicating with both thereof, a connection between the intermediate chamber and the steam dome of the locomotive, an outlet connection between said intermediate chamber and the atmosphere, a connection between the steam chest of the locomotive and the intermediate chamber between said connections, a connection between the steam chest and the first named end chamber, a floating piston within said floating valve chamber, and a movable valve assembly including a piston within the first named end chamber, a guide piston within the intermediate chamber between the floating valve chamber and the connection to the steam dome and further including a valve piston within the intermediate chamber adapted to cover and uncover the connection to the steam dome and the connection to the steam chest, and means for supplying pressure into the outer end of said floating valve chamber and for establishing communication between the floating valve chamber and the atmosphere, said means comprising a 3-way valve located within the locomotive cab and having a connection to the atmosphere and a connection to the locomotive boiler.

3. The combination with a locomotive, of a drifting and relief valve mechanism comprising a casing having end chambers and an intermediate chamber, connections to the steam dome of the locomotive, the atmosphere and the steam chest of the locomotive communicating with the intermediate chamber at spaced points, a connection between one end chamber and the steam chest, a floating piston within the other end chamber, means for supplying or permitting exhaust of pressure to or from said second named end chamber, and a movable valve assembly including a piston rod located axially of the casing, a guide piston thereon movable between the first named connection and the second named end chamber, a piston on the rod operating within the first named end chamber and a valve piston on the rod operating within the intermediate chamber and adapted to cover or uncover the connection to the steam chest and the connection to the steam dome.

4. In a locomotive, a drifting and relief valve mechanism comprising a casing having a chamber at one end thereof, a floating valve chamber at the other end thereof, an intermediate chamber communicating with both of the first named chambers, a connection between the intermediate chamber and the steam dome of the locomotive, an outlet connection between said intermediate chamber and the atmosphere, a connection between the steam chests of the locomotive and the intermediate chamber between said last named connections, a connection between the steam chests and the first named end chamber, a floating piston within said floating valve chamber, a movable valve assembly including a piston within the first named end chamber, a valve piston within the intermediate chamber adapted to cover and uncover the connection to the steam dome and the connection to the steam chest, a spindle carried by the valve piston and extending toward the floating valve chamber and adapted, when the valve piston is moved toward the floating valve chamber and the valve piston has approximately reached the connection to the steam dome, to engage said floating valve, the further movement of the valve piston of the floating valve chamber causing the stem of said piston to shift the floating valve, exerting pressure upon the floating valve tending to shift it to the opposite end of the floating valve chamber, and manually operable means for preventing or permitting movement of the floating valve to the end of the floating valve chamber remote from the steam dome connection, said means permitting the floating valve to be shifted back to its initial position at the entrance to the intermediate chamber.

In testimony whereof I hereunto affix my signature.

WILLIAM W. BOULINEAU.